June 28, 1932. H. E. DOCK 1,865,241
MEMORANDUM SUPPORT
Filed Jan. 15, 1930
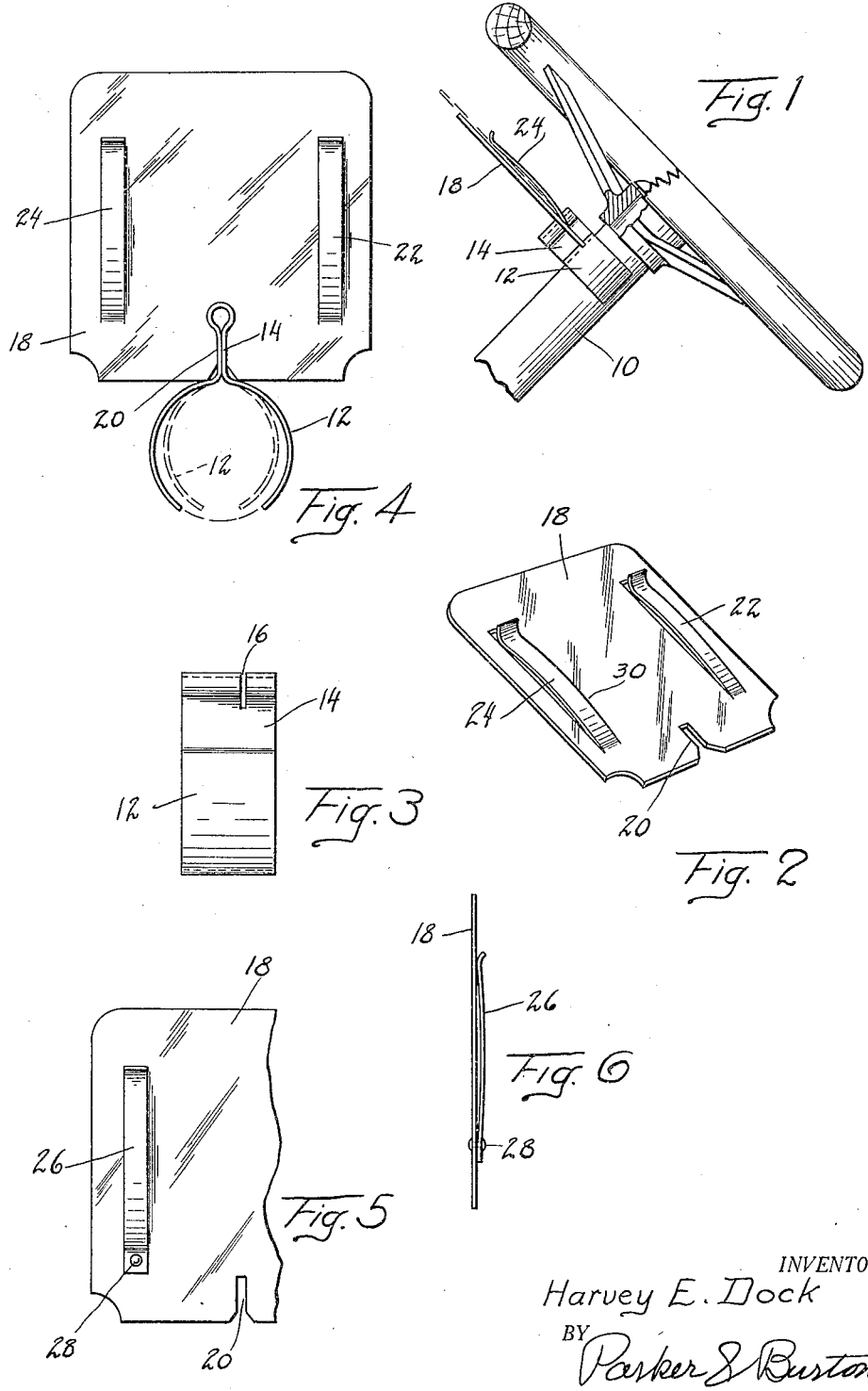
INVENTOR.
Harvey E. Dock
BY Parker & Burton
ATTORNEYS Patented June 28, 1932

1,865,241

UNITED STATES PATENT OFFICE

HARVEY E. DOCK, OF DETROIT, MICHIGAN

MEMORANDUM SUPPORT

Application filed January 15, 1930. Serial No. 420,864.

My invention relates to supports for memorandum sheets and the like, and has particular reference to a type primarily adapted for use by automobile drivers.

The primary object of my invention is to facilitate the reading and writing of various sorts of memoranda, such as addresses and delivery points, by the driver of an automobile. I propose to secure this object by utilizing a support which may be detachably clamped to a portion of the automobile in a position where it may be easily seen by the driver thereof. More specifically, I propose to support a memorandum support upon the steering column of the conventional automobile so that it may be readily detached, providing means upon the support for ready insertion of memorandum sheets.

By providing such a support I eliminate the necessity of the driver's fumbling around through various pockets in search of such memoranda as he needs while he is driving and it is obvious that such a device would find great utility in the field of delivery men, taxi-cab drivers, et cetera, where it is essential to keep several addresses in mind at the same time. Of course, there are many memorandum backing plates, provided with various devices for securing thereto divers types of memorandum sheets, but insofar as I am aware there is no support for such memorandum sheets which may be detachably connected in such an advantageous position for the above described purpose.

Another object is to provide a support of this type which is simply constructed, inexpensive to manufacture, and efficient in serving a definite need.

Still further objects of my invention will become apparent from the following description wherein like numerals refer to like parts throughout the several figures and wherein:

Fig. 1 illustrates my device mounted upon the steering column of an automobile,

Fig. 2 is a perspective of the memorandum supporting plate,

Fig. 3 is a side elevation of the plate support clamp,

Fig. 4 is a front elevation of the plate and clamp assembly,

Fig. 5 is a front elevation, partly broken away, of a modified species of memorandum plate support, and Fig. 6 is a side elevation of Fig. 5.

As illustrated in Fig. 1, my memorandum support assembly is secured to the steering post 10 of an automobile. The assembly consists of a flexible clamping member 12, the sides of which may easily be sprung apart for the purpose of securing it to different sized steering posts. This feature is clearly illustrated in Fig. 4. The clamping member 12 is provided with a flexible throat portion 14 in which there is a slot 16. As illustrated, this slot is parallel to the sides of the clamping member, but it is obvious that for certain purposes it might prove advisable to place the slot in diagonal position in respect to the sides of said clamping member.

For supporting the various sheets of memoranda I have provided the plate 18, which may be of any suitable material, although thin sheet metal has been found preferable. This plate is provided at one end with a slot 20 which is designed to dovetail in with slot 16 of the supporting clamp 14. As illustrated the slot 20 is of substantially greater depth than slot 16, and when the two are dovetailed in their assembled position the solid portions of the yielding sides of the flexible throat 14, adjacent the end of the slot 16, tend to flex outwardly against the inner edges of slot 20. In this way the plate 18 and clamp 12 are secured in assembled position without the use of screws, or any other element whatsoever. Thus a secure joint between the two elements is obtained by the use of these spring lock dovetailing slots.

On the face of the plate 18 I have provided flexible means adapted to secure memorandum sheets thereto, and these I have illustrated in Fig. 2 as consisting of single parallel strips 22 and 24, struck up from the metal plate itself, and hence integral therewith. Each of these strips, or tongues, is rounded outwardly away from the face of the plate at its extremity for the purpose of permitting ready insertion of the memorandum sheets.

Furthermore, I have found it advisable in the stamping operation to concave the tongue strips longitudinally throughout a substantial portion of their length, as at 30 in Fig. 2. In this way contact between the memorandum sheets and the burred sides of the strips, which result from the stamping operation, is eliminated. This facilitates insertion of the sheets and eliminates possible tearing thereof.

In Figs. 5 and 6 I have illustrated a somewhat modified form of flexible tongue 26, which consists of a thin spring metal strip which is secured to the plate 18 by riveting as at 28. Although these strips are not illustrated as concaved longitudinally, I contemplate such structure.

While I have illustrated the use of single parallel flexible strips for the purpose of securing memorandum sheets to the plate support it is obvious that other methods of holding them down might be utilized. My basic inventive concept resides in the simple and efficient combination of elements whereby memorandum sheets may be supported in full view of an automobile driver.

Each of the elements utilized in the combination is of simple construction and inexpensive to manufacture. The assembly is readily detachable from its support, and the elements themselves are readily detachable from one another, thus facilitating the problem of replacement.

Various modifications will be apparent to those skilled in the art and for that reason I intend to limit myself only within the scope of the appended claims.

I claim:

1. A memorandum support comprising a spring metal clamp adapted for support upon a post and having a slotted throat portion, and a memorandum sheet supporting plate having a slot opening on one edge thereof removably secured thereby within the throat slot.

2. A memorandum support comprising a spring metal clamp adapted for support upon a post and having a slotted throat portion, and a memorandum sheet supporting plate slidably engaging the slotted throat, said plate being provided with spring clips to secure the sheets thereon.

3. A memorandum support comprising a metal clamp having a flexible slotted throat portion and a supporting plate having a slot opening on one edge thereof of substantially greater depth than and interengaged with said first mentioned slot, the solid portion of said throat adjacent the end of its slot being adapted to flex against the inner edges of the plate slot and thereby lock the two together.

4. A memorandum support comprising a metal clamp having a flexible slotted throat portion, a supporting plate having a slot opening on one edge thereof of substantially greater depth than and interengaged with said first mentioned slot, the solid portion of said throat adjacent the end of its slot being adapted to flex against the inner edges of the plate slot and thereby lock the two together, and tongues struck from said plate, said tongues being concaved longitudinally throughout a substantial portion of their length.

In testimony whereof, I, HARVEY E. DOCK, sign this specification.

HARVEY E. DOCK.